US011501566B2

(12) United States Patent  
Ranganath et al.

(10) Patent No.: US 11,501,566 B2  
(45) Date of Patent: *Nov. 15, 2022

(54) FACIAL RECOGNITION SYSTEM

(71) Applicant: NEC CORPORATION OF AMERICA, Irving, TX (US)

(72) Inventors: Krishna Ranganath, Irving, TX (US); Allen Ganz, Irving, TX (US); Alvin Leong Ying Yap, Irving, TX (US); Ashlee Phillips, Irving, TX (US); Michael Molinari, Orlando, FL (US); Algernon Callier, Orlando, FL (US)

(73) Assignee: NEC Corporation of America, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/850,125

(22) Filed: Apr. 16, 2020

(65) Prior Publication Data

US 2020/0242341 A1 Jul. 30, 2020

Related U.S. Application Data

(63) Continuation of application No. 15/739,924, filed as application No. PCT/US2016/040580 on Jun. 30, 2016, now Pat. No. 10,657,362.

(Continued)

(51) Int. Cl.
*G06V 10/75* (2022.01)
*G06V 40/16* (2022.01)

(Continued)

(52) U.S. Cl.
CPC ......... *G06V 40/172* (2022.01); *G06K 9/6215* (2013.01); *G06V 10/76* (2022.01);

(Continued)

(58) Field of Classification Search
CPC combination set(s) only.
See application file for complete search history.

(56) References Cited

U.S. PATENT DOCUMENTS 1,936,117 A * 11/1933 Peschl ...................... F16H 9/00  
474/31  
6,119,096 A * 9/2000 Mann ...................... G06Q 10/02  
705/40

(Continued)

FOREIGN PATENT DOCUMENTS

CN 202150141 U 2/2012  
CN 102968613 A 3/2013

(Continued)

OTHER PUBLICATIONS

H. Al-Assam, et al., "Hidden Assumption of Face Recognition Evaluation under Different Quality Conditions", dated 2011, pp. 27-32.

(Continued)

*Primary Examiner* — Tsung Yin Tsai  
(74) *Attorney, Agent, or Firm* — Reising Ethington P.C.

(57) ABSTRACT

Various embodiments of a facial recognition system are provided. In one embodiment, a processor determines a value for a lighting parameter associated with a captured facial image, determines whether any previously obtained images in a biometric database includes a similar value for the lighting parameter and, if not, stores the newly captured image in the database along with the lighting parameter value. In another embodiment, the processor calculates a score indicative of the likelihood that the face in the captured facial image is identical to the face of a previously obtained image in the database, determines whether the score exceeds a threshold value and, if so, generates a signal indicating a match. The processor adjusts the threshold based on one or more parameter values.

17 Claims, 5 Drawing Sheets

Related U.S. Application Data (60) Provisional application No. 62/187,003, filed on Jun. 30, 2015.

(51) Int. Cl.
  *G06V 40/50* (2022.01)
  *G06K 9/62* (2022.01)
(52) U.S. Cl.
  CPC .......... *G06V 40/164* (2022.01); *G06V 40/173* (2022.01); *G06V 40/50* (2022.01)

(56) References Cited

U.S. PATENT DOCUMENTS

| | | | | |
|---|---|---|---|---|
| 6,256,418 | B1* | 7/2001 | Rehg | G06T 9/001 |
| | | | | 382/235 |
| 7,177,450 | B2* | 2/2007 | Tajima | G06V 40/161 |
| | | | | 340/5.83 |
| 7,454,041 | B2* | 11/2008 | Sukegawa | G06K 9/6255 |
| | | | | 382/218 |
| 7,848,566 | B2* | 12/2010 | Schneiderman | G06K 9/6282 |
| | | | | 382/159 |
| 8,285,006 | B2 | 10/2012 | Tang | |
| 8,295,614 | B2* | 10/2012 | Ishiyama | G06T 7/0002 |
| | | | | 382/209 |
| 8,401,245 | B2* | 3/2013 | Hashimoto | G07C 9/37 |
| | | | | 340/5.82 |
| 8,542,879 | B1* | 9/2013 | Nechyba | G06V 40/45 |
| | | | | 382/118 |
| 8,798,336 | B2* | 8/2014 | Nechyba | G06V 40/171 |
| | | | | 382/118 |
| 9,117,109 | B2* | 8/2015 | Nechyba | G06V 40/16 |
| 9,143,573 | B2* | 9/2015 | Barak | G06K 9/00295 |
| 9,217,994 | B2* | 12/2015 | Ainsley | G05B 13/026 |
| 9,256,720 | B2* | 2/2016 | Berini | G06F 21/32 |
| 9,292,754 | B2* | 3/2016 | Shin | G06V 40/172 |
| 9,408,076 | B2* | 8/2016 | Chen | G06T 7/246 |
| 9,449,217 | B1* | 9/2016 | Bourlai | G06K 9/00221 |
| 9,542,543 | B2 | 1/2017 | Niinuma | |
| 9,721,175 | B2* | 8/2017 | Kursun | G06V 40/50 |
| 9,922,238 | B2* | 3/2018 | Bourlai | G06K 9/00288 |
| 9,989,218 | B2* | 6/2018 | Lashina | F21V 14/08 |
| 10,198,645 | B2* | 2/2019 | Graumann | G09C 5/00 |
| 10,235,822 | B2* | 3/2019 | Nye | G08B 25/008 |
| 10,540,489 | B2* | 1/2020 | Richman | G06F 21/32 |
| 10,546,183 | B2* | 1/2020 | Rodriguez | G06K 9/00335 |
| 10,657,362 | B2* | 5/2020 | Ranganath | G06V 40/50 |
| 10,657,749 | B2* | 5/2020 | Nye | G07C 9/00563 |
| 10,853,678 | B2* | 12/2020 | Han | G06K 9/00288 |
| 2001/0031073 | A1* | 10/2001 | Tajima | G06V 40/172 |
| | | | | 382/218 |
| 2002/0136435 | A1* | 9/2002 | Prokoski | G06V 40/45 |
| | | | | 382/118 |
| 2003/0138134 | A1 | 7/2003 | Petrich | |
| 2004/0223631 | A1 | 11/2004 | Waupotitsch et al. | |
| 2007/0230796 | A1* | 10/2007 | Terakawa | G06V 10/143 |
| | | | | 382/195 |
| 2007/0252001 | A1 | 11/2007 | Kail et al. | |
| 2008/0317294 | A1* | 12/2008 | Hashimoto | G07C 9/37 |
| | | | | 382/115 |
| 2009/0180672 | A1* | 7/2009 | Ishiyama | G06V 40/172 |
| | | | | 382/218 |
| 2010/0318566 | A1* | 12/2010 | Yoshio | G08B 13/19671 |
| | | | | 707/774 |
| 2010/0329565 | A1* | 12/2010 | Kunieda | G06V 40/161 |
| | | | | 382/190 |
| 2013/0156278 | A1* | 6/2013 | Kim | G06V 40/172 |
| | | | | 382/118 |
| 2013/0177219 | A1 | 7/2013 | Fröjdh et al. | |
| 2013/0215275 | A1* | 8/2013 | Berini | G06F 21/34 |
| | | | | 348/150 |
| 2013/0216109 | A1* | 8/2013 | Ishikawa | G06V 40/168 |
| | | | | 382/118 |
| 2014/0075528 | A1 | 3/2014 | Matsuoka | |
| 2014/0162598 | A1* | 6/2014 | Villa-Real | H04M 1/66 |
| | | | | 455/411 |
| 2014/0301599 | A1* | 10/2014 | Shin | G06V 40/172 |
| | | | | 382/103 |
| 2014/0333414 | A1* | 11/2014 | Kursun | G06V 40/50 |
| | | | | 340/5.82 |
| 2015/0206030 | A1* | 7/2015 | Sultana | G06V 10/94 |
| | | | | 382/118 |
| 2015/0226406 | A1* | 8/2015 | Lashina | H05B 47/11 |
| | | | | 362/276 |
| 2016/0001181 | A1* | 1/2016 | Marr | G07F 17/3227 |
| | | | | 463/42 |
| 2016/0078302 | A1* | 3/2016 | Kanga | G06V 20/53 |
| | | | | 382/118 |
| 2016/0224837 | A1* | 8/2016 | Li | G06K 9/6267 |
| 2017/0076132 | A1* | 3/2017 | Sezan | G06F 21/32 |
| 2018/0189551 | A1* | 7/2018 | Ranganath | G06V 40/164 |

FOREIGN PATENT DOCUMENTS

| | | |
|---|---|---|
| CN | 103514439 A | 1/2014 |
| CN | 103714347 A | 4/2014 |
| CN | 104704435 A | 6/2015 |
| DE | 102006045752 A1 | 5/2007 |
| EP | 2416274 A1 | 2/2012 |
| EP | 3317815 A1 | 5/2018 |
| JP | 2002183734 A | 6/2002 |
| JP | 2005056004 A | 3/2005 |
| JP | 2005202731 A | 7/2005 |
| JP | 2007094637 A | 4/2007 |
| JP | 2007148968 A | 6/2007 |
| JP | 2008243217 A | 10/2008 |
| JP | 2009003659 A | 1/2009 |
| JP | 2010039981 A | 2/2010 |
| JP | 2013117876 A | 6/2013 |
| JP | 2013120580 A | 6/2013 |
| WO | WO2005096213 A1 | 10/2005 |
| WO | WO2010116470 A1 | 10/2010 |
| WO | WO2012057665 A1 | 5/2012 |
| WO | WO2014176485 A1 | 10/2014 |

OTHER PUBLICATIONS

JP Office Action for JP Application No. 2020-05368 dated Apr. 22, 2021 (6 pages).
IN Office Action for IN Application No. 201817000600 dated Dec. 14, 2020 (9 pages).
AU Office Action for AU Application No. 2020200045 dated Jan. 22, 2021 (4 pages).
EP Office Action for EP Application No. 16818852.2 dated Mar. 25, 2021 (8 pages).
Written Opinion & International Search Report for PCT/US2016/040580 dated Nov. 10, 2016, (11 pages).
Singaporean Written Opinion & International Search Report for SG Application No. 11201710840T dated Sep. 25, 2018, (7 pages).
New Zealand Office Action for NZ Application No. 738874 dated Nov. 15, 2018, (3 pages).
EP Extended Search Report for EP Application No. 16818852.2 dated Jan. 18, 2019, (10 pages).
Australian Office Action for AU Application No. 2016287726 dated Mar. 15, 2019, (5 pages).
New Zealand Office Action for NZ Application No. 738874 dated Jun. 11, 2019, (6 pages).
Japanese Office Action for Application No. 2017-568409 dated Jul. 30, 2019 (8 pages).
Australian Office Action for AU Application No. 2016287726 dated Aug. 8, 2019, (5 pages).
New Zealand Office Action for NZ Application No. 738874 dated Sep. 19, 2019, (4 pages).
New Zealand Office Action for NZ Application No. 738874 dated Oct. 30, 2019, (4 pages).
C. Pagano, et al., "Efficient Adaptive Face Recognition Systems Based on Capture Conditions", IEEE Symposium on Computational Intelligence in Biometrics and Identity Management, dated Dec. 1, 2014, XP55540086, pp. 60-67.

(56) References Cited

OTHER PUBLICATIONS

Singaporean Written Opinion & International Search Report for SG Application No. 11201710840T dated Mar. 4, 2020, 6 pages.
CN Office Action for CN Application No. 201680050176.5 dated May 8, 2021 (17 pages).
Singaporean Written Opinion & International Search Report for SG Application No. 11201710840T dated Feb. 22, 2021, 7 pages.
CN Office Action for CN Application No. 201680050176.5 dated Jan. 24, 2022 (16 pages).
CN Office Action for CN Application No. 201680050176.5 dated May 20, 2022 (12 pages).

* cited by examiner

FACIAL RECOGNITION SYSTEM

REFERENCE TO RELATED APPLICATIONS

This application is a continuation of claims the benefit of U.S. patent application Ser. No. 15/739,924 filed on Dec. 26, 2017 which is a national phase of PCT/US2016/040580 filed on Jun. 30, 2016 and claims the benefit of U.S. Provisional Application Ser. No. 62/187,003 filed on Jun. 30, 2015, the entire contents of these priority applications are incorporated herein by reference in their entireties.

BACKGROUND a. Technical Field

The present disclosure relates to the field of automated facial recognition used to validate the authorized user of an entitlement. In particular, the present disclosure relates to the fast and simple association of a human face with an entitlement such as a theme park ticket and the subsequent use of facial recognition to validate that the same person is using the entitlement in order for a service provider to ascertain that they are delivering a service or a good to the correct entitlement holder.

b. Background

Many organizations in the entertainment industry sell tickets or other forms of entitlements. Although all forms of entitlements are subject to some form of fraud, theme park tickets are particularly vulnerable to fraud because they are not limited to a single seat or other restriction. For example, in a sports stadium if one person had a ticket and made a copy of the ticket and gave it to a friend, they could not both sit in the same seat so there would be no benefit. Further, when a ticket for a specific seat is scanned and used for entrance, the stadium can track that that specific ticket has already been redeemed and if someone else were to arrive and attempt to redeem a replica of the ticket the stadium operator could prevent the duplicate entitlement from being used. For this reason, tickets for sporting events or concerts are frequently transferable, meaning that the owner of a ticket is free to give or sell a ticket to whomever they wish as long as it has not yet been used.

Theme parks tickets are normally non-transferable for a variety of reasons. Theme park tickets are typically valid for multiple re-admissions during a single day and are often valid for multiple admissions over multiple days. Further, theme park tickets are normally priced to be more expensive the first time they are used but if multiple days are purchased the price of each additional day goes down dramatically. Therefore, fraudsters have an incentive to purchase tickets with longer terms of validity and to sell tickets to others if the tickets have remaining validity. Because of the high price of theme park tickets, the incentive to share or sell tickets is greater for a fraudster and the potential damage to the theme park operator is also greater. Therefore, theme park operators have a great need to ensure that the tickets that they sell as non-transferrable are only redeemable by one person per ticket.

Traditionally, in the theme park industry, biometric finger scans are used the first time a theme park ticket is used to capture a representation of the identity of the ticket holder and then whenever the same ticket is redeemed again another finger scan is performed to determine whether the finger scan matches the finger scan that was taken when the ticket was first used. Although this method of authentication has been effective in reducing the amount of fraud, it has several significant problems. The largest problem is that only approximately 93% of people are able to consistently perform valid finger scans. Some people have difficulties because they perform manual labor that wears on the tips of their finger tips and makes their fingers more difficult to scan. Others have more oily skin that is difficult to scan by modern finger scanners. For these guests, finger scanners do not work.

Another issue with finger scanners is that, for the approximately 7% of guests for whom finger scanning does not work, there is no fast and easy way for the theme park operator to validate the guest's identity. The employee cannot look at a guest's finger and determine whether it matches an earlier finger scan, and so the process of remediating a failed scan is typically some form of interrogation of the guest that involves the showing of a photo identification and questions about the purchase and previous use of the ticket to determine whether the person currently trying to use the ticket is the same person who used it previously. This interrogation of a guest who paid a lot of money for a theme park ticket and is in a rush to enter the theme park provides a negative impression and reduces guest satisfaction.

Another technology that is used to authenticate guests is photo referencing. Photo referencing is where a photo is taken of a guest when an entitlement is first redeemed and when the entitlement is redeemed again an employee is able to access the previous photo to see if the person currently trying to redeem the entitlement is the same person or not. This technology also has several disadvantages. For example, it requires employees to review photos of all guests entering a park which can be slow. Even if it adds only one additional second to each transaction, the front gate of a major theme park may process 10,000 transactions in an hour and the added time requirements result in either longer lines or the need to hire additional staff and purchase additional turnstiles. Second, having an employee check a photo ID for each guest puts the employee in the position of challenging each guest who enters the park and being an obstacle to entrance that must be overcome rather than putting them in the position of focusing on the guest and providing excellent guest service in an attempt to help facilitate the guest's entrance. Another disadvantage of the use of such photo referencing is that each guest interaction requires a team member to access a photo of the guest. Today's consumers are very concerned about privacy and the use of any personally identifiable information (PII), including photos. Therefore, the use of a photo that must be viewed by a human (and may be viewed by multiple humans in the vicinity) may cause unease for guests who are concerned about privacy. It is a goal of presently disclosed embodiments to reduce the use of guest images to an absolute minimum.

SUMMARY

The present disclosure relates to facial recognition systems. In particular, one embodiment of the present disclosure relates to a system that is configured to build a biometric database that includes images taken in various lighting conditions so that authentication is more likely to occur and throughput is thereby increased. Another embodiment of the present disclosure relates to a system that is capable of varying the thresholds at which authentication is determined responsive to changes in various parameters in order to better control throughput.

A facial recognition system according to one embodiment includes a camera and a processor configured to receive image data from the camera. The image data includes a first image of a face of an individual. The processor is further configured to determine a first value for a lighting parameter associated with the first image. The processor is further configured to determine whether a collection of previously obtained images of the face of the individual in a biometric database includes a second image having a second value for the lighting parameter that meets a first predetermined condition relative to the first value for the lighting parameter. The processor is further configured to store the first image in the biometric database along with the first value for the lighting parameter when the collection of previously obtained images does not include a second image having a second value for the lighting parameter that meets the first predetermined condition relative to the first value for the lighting parameter.

A facial recognition system according to another embodiment includes a camera and a processor configured to receive image data from the camera. The image data includes a first image of a face of an individual. The processor is further configured calculate a first score indicative of the likelihood that the face of the individual in the first image is identical to the face of the individual in a second image from a biometric database. The processor is further configured to determine whether the first score exceeds a dynamic match threshold and generate a signal indicating that the faces of the individual in the first and second images are identical if the first score exceeds the dynamic match threshold. The processor is further configured to adjust the dynamic match threshold based on values of one or more parameters.

A facial recognition system in accordance with the present invention represents an improvement as compared to conventional systems. In one embodiment, the storage of images of an individual taken in various lighting conditions enables more accurate future authentication and improves system throughput. In another embodiment, variation of the match threshold for authentication allows control of system throughput to achieve various system goals.

The foregoing and other aspects, features, details, utilities, and advantages of the present invention will be apparent from reading the following description and claims, and from reviewing the accompanying drawings.

BRIEF DESCRIPTION OF THE DRAWINGS

A clear understanding of the key features of presently disclosed embodiments may be had by reference to the appended drawings, which illustrate methods and systems in accordance with present embodiments. It will be understood that these drawings depict specific example embodiments and, therefore, are not to be considered as limiting in scope with regard to other embodiments covered by the present claims.

DETAILED DESCRIPTION OF PREFERRED EMBODIMENTS

Figure 1:
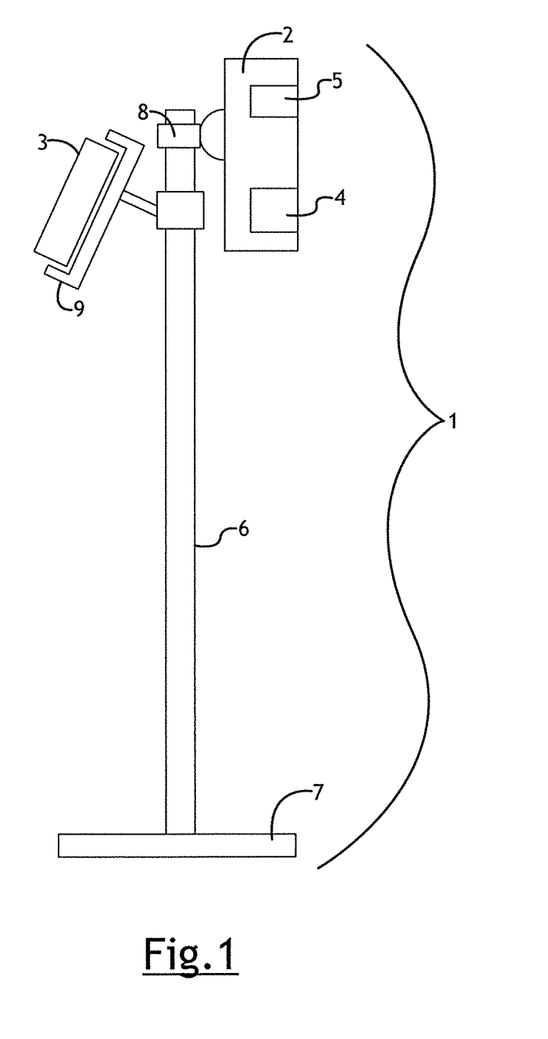
FIG. 1 is a side-view of a facial recognition system including a guest interface, a team member interface, and a pedestal upon which the system is mounted in accordance with present embodiments.

Referring to FIG. 1, an embodiment of the present disclosure may include a facial recognition system 1. The facial recognition system 1 may include a guest interface 2 and a team member interface 3. The guest interface 2 provides a feature through which a guest or user may interact with the system by presenting an entitlement such as a ticket to the entitlement scanner 4. In one embodiment of the present disclosure the entitlement scanner is a barcode reader which is capable of reading barcodes on guest entitlements such as theme park tickets, vouchers, or coupons. The barcodes may be displayed on any form of physical media including paper tickets, electronic devices such as a smart phone, or other media which may be scanned by a barcode scanner. In one embodiment of the present disclosure, the entitlement scanner may be a radio frequency identification (RFID) scanner which is capable of scanning any of a variety of types of RFID tags, including near-field communication (NFC) tags. The RFID tags contain unique codes which are used to identify an entitlement. Other embodiments of the entitlement scanner may be used to identify an entitlement as long as they can be used to read some form of media to identify the identifier of the entitlement. Such other forms of entitlement scanner may include, but are not limited to, magnetic stripe readers, non-linear barcode readers, Bluetooth scanners, etc.

Figure 2:
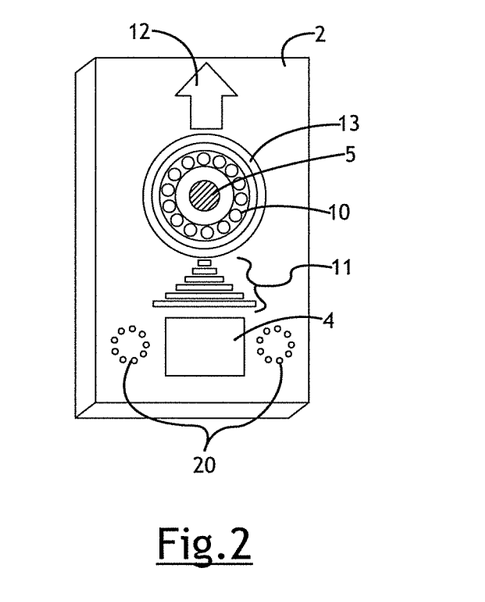
FIG. 2 is a front view of the guest interface in accordance with present embodiments.

The guest interface 2 may also include a camera 5. The camera 5 may be used to capture biometrics of an entitlement holder. In one embodiment, the camera 5 is a video camera capable of capturing multiple images of a guest each second. These images may be converted by facial recognition software executed by a processor in system 1 into biometric templates that biometric software can use to identify the guest whose face has been captured. The processor may comprise a programmable microprocessor or microcontroller or may comprise an application specific integrated circuit (ASIC). The processor may include a central processing unit (CPU) and an input/output (I/O) interface through which the processor may receive a plurality of input signals and generate a plurality of output signals including signals received from and sent to camera 5 and interfaces 2, 3. The images may also be converted into images that can be viewed by a human to verify the identity of the guest. Although the illustrated embodiment uses a video camera to capture guest images, other embodiments of capturing images for facial recognition may be used, including still cameras. Camera 5 may operate in one or more radio frequency (RF) bands. In one embodiment, the camera operates in both the visible light RF band and the near infrared (NIR) RF band. The use of the visible light RF band provides the advantage of creating color images that a human reviewer can view in a natural color palette visible to human eyes, making it much easier for humans to remediate transactions where the biometric software 14 is unable to make a match. The advantage of the use of the NIR RF band is the ability of the facial recognition system 1 to operate in a multitude of different lighting conditions ranging from bright sunlight to absolute darkness. The use of the NIR RF band provides the additional advantage of allowing the facial recognition system 1 to utilize NIR light emitting diodes (LED) to enable the LED lighting 10 to illuminate the guest, wherein the LED lighting 10 will not be intrusive for the guest. It should be noted, however, that other embodiments of the camera 5 may include the ability of the camera to capture images in one or more other RF bands either in addition to, or instead of, the visible light and NIR bands. Furthermore, other embodiments of the camera 5 may operate in only one RF band, or any number of multiple RF bands. In one embodiment, the operation of the camera in only the NIR RF band.

While the illustrated embodiment uses a camera 5 to capture a facial image of a guest that can be used for authenticating by facial recognition software, other types of biometric identification could also be used in accordance with present embodiments. These other forms of biometric identification include, but are not limited to, finger scans, iris scans, hand geometry scans, vein geometry scans, voice biometric scans, or any of a multitude of other forms of biometric identification. Further, forms of biometric identification may be used individually or in combination. The use of more than one form of biometric identification in combination is referred to as multi-factor biometrics and has the advantage of being more accurate in identifying a specific person than a single biometric can in isolation. The purpose of the camera 5 is to provide a feature for a guest to provide some form of biometric input to the facial recognition system 1. If other types of biometrics are used, other types of biometric input devices may be used instead of, or in addition to, a camera 5. The guest interface 2 will be described in greater detail in reference to FIG. 2 below.

In one embodiment, the camera 5 is positioned near the entitlement scanner 4. The advantage of this arrangement is that when the guest scans their ticket they must be looking at the entitlement scanner 4 (it would be nearly impossible for a guest to scan a ticket using the entitlement scanner 4 without looking at where they are placing the ticket). Since the performance of facial recognition systems is highly dependent on users looking as directly at the camera as possible, this positioning ensures that the guest is looking as near to the camera 5 as possible and maximizes the chance of getting a high quality image from the guest without having to provide any instructions to the guest regarding what they should do.

One embodiment of the facial recognition system 1 may also include a team member interface 3. The team member interface provides an interface for a team member, employee, or other representative of the entity that fulfills an entitlement with an interface to be used to handle exceptions to the biometric authentication process. Exceptions may include tickets that do not properly scan, failure of the biometric system to successfully authenticate a guest, or other failure of the system requiring human intervention. Although the team member interface 3 is not strictly necessary, one embodiment will include the team member interface 3 to improve the overall performance of the system and enable a smooth mechanism for handling exceptions to the entitlement authentication process. In one embodiment, the team member interface 3 is an electronic tablet such as a PANASONIC TOUGHPAD, an APPLE WAD, or a MICROSOFT SURFACE. Such tablets are lightweight, portable, relatively inexpensive, and generally possess the computing power to serve as effective team member interface 3. They also typically have wireless network connectivity and batteries that will allow for several hours of continuous use without the need to recharge or replace the battery. In one embodiment, the team member interface 3 would be ruggedized so that it may be used indoors and outdoors and so that it may withstand the rigors of operation in a challenging physical environment that includes extreme high and low temperatures, varying weather conditions including wind and rain, bumps and drops, and other environmental conditions that may break a non-ruggedized team member interface 3. Although some embodiments utilize an electronic tablet for the team member interface, many types of electronic devices could perform the function of the team member interface 3 including, but not limited to, laptop computers, smartphones, smart watches, desktop computers, or custom built electronic devices. The team member interface will be described in greater detail in relation to FIG. 3 below.

The facial recognition system 1 may also include a component or components for supporting the system for ergonomic use of the system or for making the system portable. One embodiment includes a pedestal 6 upon which other elements of the system may be mounted and a base 7, which secures the pedestal 6 to the ground and keeps the facial recognition system 1 steady. Brackets may be used to affix elements of the facial recognition system 1 to the pedestal 6. A guest user interface bracket 8 may be used to affix the guest user interface 2 to the pedestal 6. The guest interface bracket 8 may be adjustable to change the physical positioning of the guest user interface 2, such as allowing it to change heights or to have the camera 5 change the direction in which it is pointed. The adjustable positioning may include a fixed number of pre-set positions or it may include a range of motion within which the guest user interface 2 may be moved. Allowing the guest user interface 2 to change positions has the advantage of allowing guests of different heights to use the same device while still being able to stand near enough to the device to be able to interact with it at arm's length and to be in the field of view (FOV) of camera 5.

A team member interface bracket 9 may be used to affix the team member interface 3 to the pedestal 6. In one embodiment, the team member interface bracket 9 provides a feature to affix the team member interface 3 to the pedestal 6 and also a feature to securely hold the team member interface 3 so that it cannot drop, be knocked out of the team member interface bracket 9, or taken by unauthorized people.

In one embodiment, the pedestal 2 is a metal pole designed such that objects may be affixed thereto. However, other features for supporting the other elements of the facial recognition system 1 include, but are not limited to, brackets affixed to architectural elements (e.g., a wall or a column), a piece of furniture (e.g., a desk, a table, or a chair), a cart, or other features for supporting said elements. In one embodiment, the pedestal 6 is made of metal such as stainless steel. However, other embodiments wherein the pedestal 6 consists of other materials are within the scope of the present disclosure, preferably wherein the other materials are rigid and/or durable. Such materials may include, but are not limited to, plastic, wood, or other forms of metal.

In one embodiment, the base 7 is a circular disk that is made of stainless steel and filled with concrete. This configuration provides a wide base for stability and enough weight to keep the center of gravity of the overall facial recognition system 1 low to the ground. Other materials can also be used in accordance with present embodiments, including other forms of metal or plastic to form the structure of the base 7 as well as other materials such as lead weights or sand to provide weight.

Other embodiments utilize different form factors for the base 7 altogether. In one embodiment, the base 7 consists simply of a metal sleeve that wraps around the pedestal 6 and enables it to fit snugly into holes in the ground. In another embodiment, the base 7 consists of several wheeled spokes wherein the radius of the spokes is sufficient to provide a broad, stable base for the facial recognition system 1 and wherein the wheels provide an easy form of mobility for the facial recognition system 1. The base 7 could take many forms and still perform the desired function of securing the facial recognition system 1 to the ground in a stable way in accordance with present embodiments.

Referring to FIG. 2, the guest interface 2 is shown from the front view (i.e., from the perspective of the guest who is interacting with the guest interface 2) and in greater detail than FIG. 1. The guest interface 2 will be described herein with regard to how it is intended that the guest will interact with the device.

In one embodiment, the camera 5 is a video camera that takes multiple images per second. In one embodiment, the camera 5 operates at 20 frames per second (FPS), however different cameras may be substituted that operate at faster or slower frame rates. Further, individual cameras may be adjustable to operate at different speeds depending on how they are configured or depending on the use of the device. The advantage of operating at a higher frame rate is that the facial recognition system 1 will capture more images of a guest over a given amount of time, increasing the probability that one of the images will be of a high enough quality to produce a match. An advantage of having the camera 5 operate at a lower frame rate is that fewer frames per second will require less computing power and memory in order to process each individual image and to attempt to match each individual template against the templates stored in the database. According to the National Institute of Standards and Technology (NIST), a desired resolution of the camera 5 is a minimum of 480 pixels in the horizontal direction by 600 pixels in the vertical direction. However, embodiments wherein the camera 5 has a greater resolution such as 768×1024 or other resolutions would be desired over the minimum resolution recommended by NIST. Generally speaking, the greater the resolution of the camera 5 the greater the quality of the images it produces. However, the trade-off is that greater resolution requires larger file sizes for any stored images and greater amounts of computing power to process the images. A wide range of resolutions could be used in various embodiments. Furthermore, present embodiments may include resolutions that are inferior to that recommended by NIST, however the quality of the facial recognition could suffer and make the facial recognition system 1 less effective.

NIST also recommends that the camera 5 use pixels with a pixel aspect ratio of 1:1 and also recommends that the aspect ratio of the image be 4:5 or 3:4. One embodiment uses a 16:9 widescreen panoramic aspect ratio that is turned in a portrait orientation to provide the greatest range of capture in the vertical direction, thus enabling the facial recognition system 1 to be more easily used by guests of varying heights. Different aspect ratios may be used in accordance with present embodiments.

When the guest approaches the guest interface 2, they will present their entitlement to the entitlement scanner 4. The successful scan of a guest's entitlement will trigger a software process executed by a processor of system 1 for the guest interface 2 to capture the guest's biometrics and indicate to the guest what they should do. In one embodiment, the camera 5 captures video at all times. However, in one embodiment, the camera only capture images once an entitlement is presented to the entitlement scanner 4. When the guest entitlement is scanned the facial recognition system 1 will begin to identify the guest's face in the images (i.e., frames) captured by the camera 5. In one embodiment wherein the camera 5 is capturing video at all times, the facial recognition system 1 will begin with frames captured before the entitlement is scanned, up to an amount of time determined by a pre-scan timer. In one embodiment, the pre-scan timer is set to a default of one second, but is configurable. If the entitlement is being used for the first time then the facial recognition system 1 will enroll the guest by associating the guest's biometrics with the entitlement. If the entitlement is successfully scanned at time=T, then the facial recognition system 1 will capture images of the guest from time T minus the duration of the pre-scan timer until time T plus an enrollment timer. In one embodiment, the enrollment timer is set to a default of three seconds, but is configurable. The facial recognition system will take all images captured during this interval and for each image it will generate a captured full-size image, a captured thumbnail image, and a captured template. The captured full-size image is the raw image captured by camera 5. The captured thumbnail image is a compressed version of the captured full-size image, which has the benefit of having a smaller file size, making it easier to store, to process, and to transmit across a network. The captured template is a biometric template that is a binary representation of quantitative features of the guest's face.

One key advantage of having the guest scan their own entitlement rather than presenting their entitlement to a team member for the team member to scan is that it changes the dynamic of the interaction. Rather than the employee challenging the guest for their entitlement and being the arbiter of whether the guest may enter or not, the facial recognition system 1 is the arbiter of whether the guest can enter or not and the guest is able to perform simple self-service. This changes the role of the team member from being an obstacle to entrance to being a facilitator to entrance by placing the team member in the role of assisting the guest and providing excellent guest service. Furthermore, from a team member perspective, it changes the nature of the interaction from being highly transactional where the team member is focused on getting the entitlements and properly scanning them as quickly as possible (with their attention thus focused on the entitlements rather than focused on the guest) to an interaction where the attention of the team member is focused almost exclusively on the guest, which enables the team member to focus on providing excellent guest service.

Figure 3:
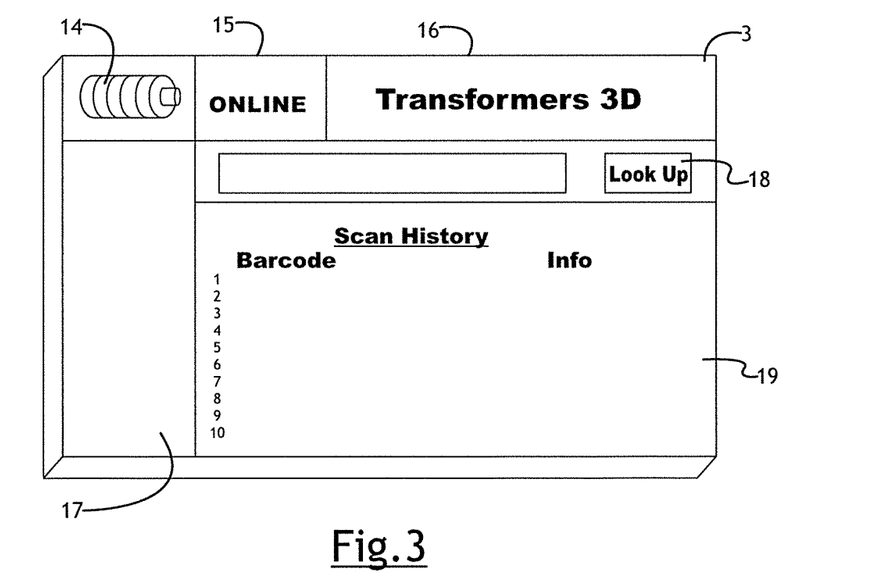
FIG. 3 is a front view of the team member interface in accordance with present embodiments.

The conversion of captured images to captured templates is performed by biometric software executed by a processor in system 1. In one embodiment, the biometric software is NeoFace software developed by NEC Corporation. However, there are many biometric software products made that perform facial recognition and that other biometric software products may be used instead of NeoFace software. Further, in one embodiment, the biometric software is stored and runs on the team member interface 3. However, the biometric software could be stored and/or run in other locations such as on other hardware or storage locations, including in the cloud, in accordance with present embodiments.

Following conversion of the captured images, the facial recognition system 1 will determine which image or images of the guest are of the highest quality and will upload them to a biometric database 14, which is described in more detail regarding FIG. 5 below. The quality of the images is determined automatically by the biometric software and the quality measurements are quantitative scores that predict the likelihood that the templates will be able to successfully match during future transactions. The captured full-size images, captured thumbnails, and captured templates that are uploaded to the biometric database 14 become stored full-size images, stored thumbnails, and stored templates respectively. Once the facial recognition system 1 has uploaded the desired files to the biometric database 14 it will permanently delete all captured full-size templates, captured thumbnails, and captured templates from the current transaction.

In one embodiment, stored full-size images, stored thumbnails, and stored templates are only held in the biometric database 14 until the end of the validity of the entitlement; after the entitlement has expired the biometric database 14 will delete all stored full-size images, stored thumbnails, and stored templates associated with the expired entitlement. An advantage of this automatic deletion process is that it protects guests' personally identifiable information by storing it for only the minimum amount of time necessary to fulfill the purpose of its capture. In one embodiment, stored full-size images, stored thumbnails, and stored templates may be kept in the biometric database beyond the expiration of the entitlement. Generally, this would be done for the purposes of auditing past transactions (e.g., for a manager to review the overrides performed by a team member to ensure that the team member had only performed overrides for stored thumbnails that looked similar to captured thumbnails), for improvement of the technology (for example, reviewing failed matches to see the images involved to see if improvements to software and/or hardware could increase the likelihood of valid matches being performed), for training, or for other purposes.

If, instead, the entitlement has been previously used then the facial recognition system 1 will contact the biometric database to obtain all stored templates associated with the presented entitlement. The facial recognition system 1 will concurrently begin processing images starting at time T minus the pre-scan timer and converting said images to captured templates. All captured templates will be compared to all stored templates using biometric software and for each pair the biometric software will calculate a score that is associated with the likelihood that the two compared templates are of the same person. The scores for each pair of compared templates will be stored. If any of the scores exceeds a pre-determined match threshold then the entitlement holder will be considered to have been authenticated. In one embodiment, a second threshold called an average match threshold can be set to a pre-determined value that will typically be lower than the match threshold. If at any time no match scores exceed the match threshold but a pre-configured number of scores (e.g., the default pre-configured number of scores may be three but may also be configurable to other integer values) exceed the average match threshold then the entitlement holder will be considered to have been authenticated.

One objective of present embodiments is to provide a facial recognition system 1 which has very fast transaction speeds and very few exceptions requiring team member intervention to remediate failed matching transactions. This results in high levels of throughput for the system, enabling lines to move quickly and guests and team members to be satisfied with the system. To achieve this aim, in one embodiment, the match threshold and average match threshold can be set at a level that provides the desired throughput. For example, if the desired throughput requires that only 5% of transactions result in a team member remediation of a failed match, but the current match threshold and average match threshold result in 10% of transactions requiring remediation, then the match threshold and/or the average match threshold can be reduced to increase the likelihood that the software will match two templates, thus reducing the number of remediations. A trade-off is that the use of lower thresholds may increase the likelihood of false positives, which means that two different people may look sufficiently alike to be able to redeem the same entitlement. The trade-off in how the thresholds may be set is between speed of transactions and fraudability (potential for being defrauded) of the system.

In one embodiment, the facial recognition system 1 provides the ability to set the match threshold and the average match threshold to levels that optimize the desired balance between throughput and fraudability of the system. Thus, and with reference to FIG. 6, a processor in system 1 may be configured to perform a number of steps as described above including the steps 30, 32 of receiving image data from camera 5 and calculating scores indicative of the likelihood that the face of the individual in the image obtained from camera 5 is identical to the face of an individual in any of a collection of previously obtained images stored in biometric database 14. The processor may further adjust the match threshold and average match threshold in step 34 responsive to a variety of parameters that may be indicative of the level of actual or anticipated use of system 1 (and thereby affect throughput) and/or potential fraudulent use of an entitlement or fraudulent attempt to gain access to a location, facility, attraction or resource. The parameters may, for example, include the calendar date or time of day. In the case of a theme park, a greater number of visitors may be expected on certain dates (e.g., weekends or summers) relative to others and at certain times (e.g., near the opening time for the park) relative to others. Another parameter may be the actual or anticipated state of the weather. In the case of a theme park, inclement weather may decrease the number of visitors such that throughput is less of a concern. Other parameters may include the frequency of use of system 1 or performance speed of system 1. If system 1 is under intense use and/or is experiencing slow performance, for example, a need may exist to lower thresholds to insure adequate throughput. Another parameter may be the number of times that the dynamic match threshold is not exceeded. If too many attempts at authentication fail, the thresholds may again need to be lowered to insure adequate throughput. Another parameter may comprise the number of uses or period of use of an entitlement. The thresholds may be increased or lowered if the number of uses indicates fraud is more or less likely to occur or if the attempted use occurs during a time period when fraud is more or less likely to occur. Thus, the thresholds may have different values during different periods of validity for an entitlement. Other potential parameters may include previous successful or failed authentications associated with a particular entitlement including a history of fraud associated with an entitlement, attraction or facility/park, location, resource or system 1, a history of overrides of failed authentications associated with any of the foregoing, the type of entitlement, attraction, facility/park, location or resource (e.g., some may require greater security than others; in the case of a theme park, some attractions may set thresholds to permit repeat access or prohibit repeat access and some attractions (e.g., more popular attractions) may set higher thresholds than others), and usage patterns and levels associated with any of the foregoing. The processor in system 1 may adjust the thresholds in a variety of ways including adjusting by predetermined amounts or amounts determined responsive to a formula taking into account one or more of the parameters. The processor may further limit the amount of adjustment by prohibiting adjustment beyond predetermined limits.

Figure 6:
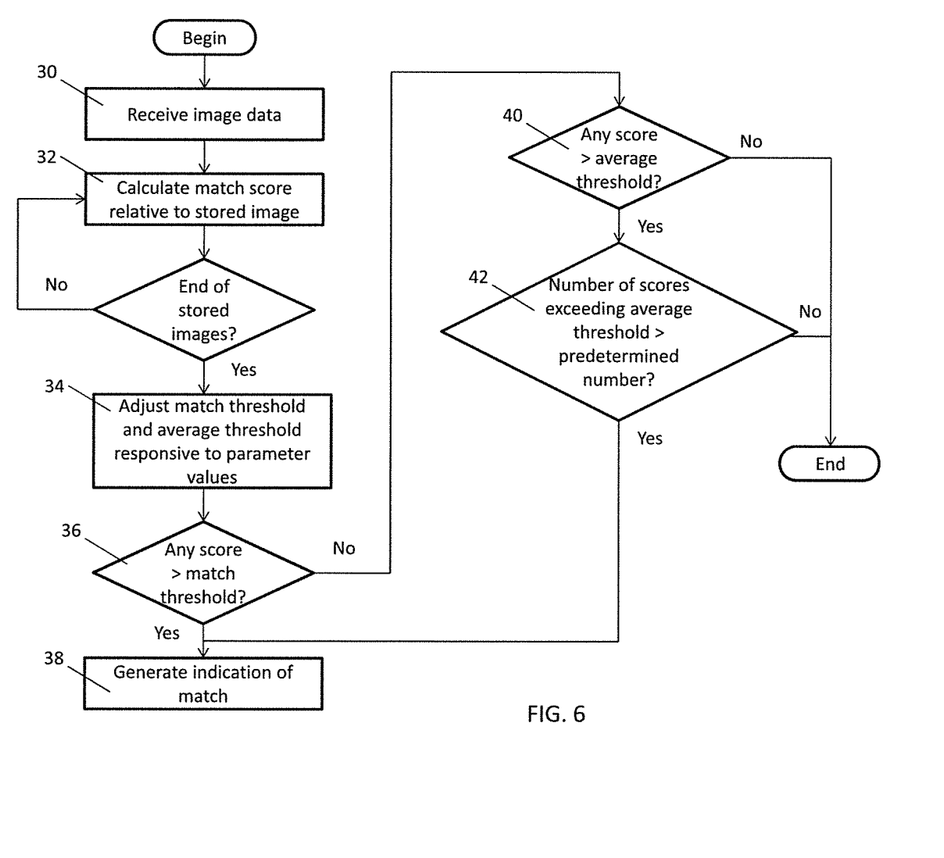
FIG. 6 is a flowchart diagram illustrating operation of a facial recognition system in accordance with the present embodiments; and, FIG. 7 is a flowchart diagram illustrating operation of a facial recognition system in accordance with the present embodiments.

As discussed above, once the match threshold and average match thresholds are set, the processor may, in step 36, determine whether any of the previously calculated scores exceeds the match threshold and, if so, generate a signal indicating a match (i.e., that the faces of the individual in the image captured by camera 5 is identical to a stored image) in step 38. If none of the scores exceed the match threshold, the processor may, in step 40, determine whether any of the scores exceed the lower, average match threshold and, if so, whether the number of scores exceeding the average match threshold exceed a predetermined number in step 42. If so, the processor may again generate an indication of a match. Although the embodiment described hereinabove focuses on particular comparisons and adjustments to particular threshold values, it should be understood that alternative embodiments are within the scope of these teachings. For example, the above embodiment compares a single image of the face of an individual captured by camera 5 against a collection of previously obtained images in database 14. System 1 may compare multiple captured images of the face of the individual against the collection of previously obtained images and may have adjustable thresholds relating to the number of matches that must be indicated as between any one captured image and the collection of previously obtained images and/or as between more than one captured image and the collection of previously obtained images. System 1 may also require that, in a comparison of multiple captured images to the collection of previously obtained images, an adjustable number of captured images must exceed one or more adjustable thresholds and further, that the adjustable number of captured images comprise a number of consecutive images or a number within an adjustable range of consecutive images.

The biometric software will continue to compare all stored templates to all captured templates until either a successful match is made or until a match timer has expired. The match timer is a pre-determined amount of time after which, if the software has not yet made a successful match, it will be considered that the software was unable to authenticate the entitlement holder to the entitlement. In one embodiment, the match timer is pre-determined to be two seconds, but is configurable to other amounts of time. If the match timer is reduced then the likelihood of a match for any individual transaction is decreased, but the average transaction speed is likely to be reduced. The match timer may be set to an amount of time that is based on the amount of time that it takes for matches to take place. For example, if successful matches almost never take longer than one second then the match timer can be set to one second. If the match timer expires without the biometric software having made a successful match then the entitlement holder will be considered to have not been authenticated.

In one embodiment, the guest interface 2 includes LED lighting 10. The LED lighting 10 consists of one or more LEDs that, when lit, illuminate the guest's face to improve the quality of the images captured by camera 5. The LED lighting may operate in the visible light spectrum, in the NIR spectrum, and/or in other RF spectrum as appropriate for the application. In one embodiment, the LED lighting 10 is only active in the NIR spectrum, which when combined with the camera 5 also operating in the NIR spectrum enables the LED lighting to effectively illuminate the guest's face without being intrusive to the guest. The LED lighting may consist of multiple LEDs in almost any configuration. In one embodiment, the LED lighting consists of multiple LEDs configured in a ring around the camera 5. Such LEDs can be easily found and inexpensively purchased from suppliers of photography equipment. In one embodiment, the LED lighting would consist of multiple LEDs configured in an array that is spread as evenly as possible across the front of the guest interface 2. Such a configuration would provide a more evenly distributed amount of illumination across the guest's face and would improve the quality of the captured images, however it may require custom developed hardware which would increase the cost of the device. In one embodiment, the front of the guest interface 2 is concave, with the LED lighting 10 being evenly distributed across sections of the guest interface 2. This configuration improves the even lighting of the guest face which increases the quality of the captured images and templates. In one embodiment, the LED lighting 10 may be covered by a diffusing material that allows light to pass through while spreading the light more evenly across a guest's face. Covering the LED lighting 10 with a diffusing material has the further advantage of hiding the LED lighting 10 and making the guest interface 2 more attractive.

In one embodiment, the guest interface 2 also includes a progress indicator 11. The progress indicator 11 consists of a series of LED lights that, when illuminated, communicate to the guest the progress that the facial recognition system 1 is making. The progress indicator 11 may consist of a multiple rectangular bars that are illuminated by LEDs and situated between the entitlement scanner 4 and the camera 5, wherein each bar is of a different length and wherein the longest bar is nearest the entitlement scanner 4 and the bars decrease in length until the shortest bar is nearest the camera 5. The LEDs may be of any color, or multiple colors. In one embodiment, the LEDs may be blue or white. In one embodiment, the LED bar nearest the entitlement scanner 4 is always on, indicating to the guest where to present their entitlement. Once the entitlement has been scanned the LED bars of the progress indicator 11 will light up in order, starting with the bar nearest the entitlement scanner 4 and lighting up each successive LED bar until all LED bars have been illuminated. In one embodiment, the amount of time that it takes for all LED bars to be illuminated is equal to the enrollment timer when guests are enrolling or equal to the match timer for subsequent transactions. Other forms of illumination may be used in place of LEDs, such as incandescent bulbs, computer screens or monitors, liquid crystal displays (LCD), or other forms of illumination in accordance with present embodiments. Further, other forms of a series of LEDs could be used to signal progress in accordance with present embodiments. For example, the LEDs could be configured horizontally or vertically in the form of a progress bar. In one embodiment, the LEDs are configured as concentric circles around the camera 5 and become illuminated starting with the outermost LED and moving toward the innermost LED. This configuration has the additional advantage of drawing the guest's attention toward the camera 5, which improves the ability to capture high quality guest images. In one embodiment, a video screen could be incorporated into the guest interface 2, allowing different images or videos to be displayed on the guest interface 2. There are myriad ways to display indicators of progress, transaction success, and transaction failure on the guest interface 2 in accordance with present embodiments.

For an enrollment transaction, at the conclusion of the enrollment timer the progress indicator 11 should no longer be illuminated and instead the success indicator 12 should be illuminated. For a match transaction, when a match is successfully made by the biometric software, the success indicator 12 should be illuminated. In one embodiment the success indicator 12 is in the shape of an up arrow and is illuminated with green LEDs. However, in accordance with present embodiments, the indicator may be of any shape that communicates to the guest that their transaction has been successful and that they may continue. Further, the indicator could also be of any color.

In one embodiment, the guest interface 2 also includes an exception indicator 13. The exception indicator 13 is used to signal to the guest that their transaction has not been successful and that they should await further instructions from the team member. In one embodiment, the exception indicator 13 is configured as a ring around the LED lighting 10 and is illuminated using yellow LEDs. However, in accordance with present embodiments, the exception indicator 13 could be located anywhere on the guest interface 2 where it would be visible to the guest, that it could be illuminated using various devices of illumination other than LEDs, that it could be in any shape, and that the exception indicator 13 could be any color. In one embodiment, the exception indicator 13 could be red and/or be shaped in an octagonal shape to give the appearance of a stop sign.

In one embodiment, speakers 20 may be incorporated into the guest interface 2 in order to provide audio signals to the guest and to the team member operating the facial recognition system 1. The speakers 20 may be sufficiently loud to be heard in a noisy theme park environment but not so loud that they are able to damage the ears of the guest or the team member. In one embodiment, the speakers 20 will have features for the volume to be adjusted by the team member operating the facial recognition system 1. The features could include a manual knob or dial or buttons on the side of the device or the features could be included as part of the user interface in the guest interface 2. In one embodiment, different audio signals are produced when different outcomes occur with the facial recognition system 1. For example, an enrollment may produce one audio signal whereas a successful match may produce a second audio signal and a failed match may produce a third audio signal. Present embodiments may have additional audio signals for failed ticket scans or other exception conditions. In one embodiment, the specific sound, intensity, and duration of each audio signal may be configurable and audio signals can be added or removed by means of simple software modifications to the guest interface 2. In one embodiment, the guest interface 2 contains two speakers 20. However, in accordance with present embodiments, any number of speakers may be used as long as they are able to convey the necessary audio signals to the guest and/or the team member. In one embodiment, no speakers 20 are used.

In one embodiment, the guest interface 2 may be configured such that if a guest scans an entitlement which may be fraudulent the guest interface 2 and the various indicators on it (e.g., the progress indicator 11, success indicator 12, exception indicator 13, and/or the speakers 20) will not do anything, making it appear to the guest as though the ticket is not being scanned properly. This feature is advantageous because if fraud is suspected the team member should confiscate the guest entitlement if possible. If the guest interface 2 indicates to the guest that the entitlement is not valid then the guest may leave and take the fraudulent entitlement with them. Having the guest interface 2 give the appearance that there is simply a problem with the entitlement being scanned gives a team member operating the device the opportunity to request that the guest hand them the ticket so that the team member can help the guest to perform the ticket scan. Once the team member has taken possession of the entitlement if they determine that the entitlement is fraudulent then the entitlement is easily confiscated.

Referring to FIG. 3, a front view of the team member interface 3 is shown. In one embodiment, the team member interface 3 is a tablet such as a PANASONIC TOUGHPAD. FIG. 3 shows the user interface which is displayed on the tablet using software. In one embodiment, the user interface includes a battery life indicator 14, which displays the amount of life that is remaining in the battery that powers the team member interface 3.

In one embodiment, the team member interface 3 also contains an online indicator 15. The online indicator 15 provides an indicator to the person operating the team member interface 3 whether the tablet is online or offline. If the operator is aware of the networked status of the device it can help them with troubleshooting any problems with the device.

In one embodiment, the team member interface 3 includes a location indicator 16. The location indicator 16 shows which location the team member interface 3 is configured for. In a theme park setting, the location indicator may be used to indicate which attraction the team member interface 3 is being used at. Because conditions at different attractions may vary, it would be advantageous for certain settings, such as lighting levels of the LED lighting 10, to be different at different attractions. Other configurations may also be configurable based on the location where the facial recognition system 1 is being used, such as timers or other configurations of hardware or software. In addition, in one embodiment, the team member interface 3 is able to communicate with the guest interface 2 and by setting the location in the team member interface 3 entitlement scans can be tracked by the location where they took place.

In one embodiment, the team member interface 3 includes a status indicator 17. The status indicator 17 is an area of the screen of the team member interface 3 wherein the status of the most recent entitlement scan can be displayed in a format that will make it easy for the team member who is operating the team member interface 3 to quickly see and understand the status. For example, in one embodiment, if the most recent transaction was a successful enrollment or a biometric then the status indicator 17 may be filled in with bright green. If the most recent transaction was a failed biometric match or if there was a problem with the entitlement scan (such as an invalid entitlement) then the status indicator 17 may be filled with bright yellow. And if the most recent transaction involved an entitlement which may be fraudulent the status indicator 17 may be filled with bright red. The status indicator 17 may also display words (such as error codes, descriptions of error codes, and/or instructions) or other symbols to the team member.

In one embodiment, the team member interface 3 may also contain a ticket lookup tool 18. The ticket lookup tool 18 provides a tool to the team member for them to be able to scan an entitlement or manually enter the identifier of the entitlement and look up the usage history of the entitlement and other relevant information about the entitlement. The ticket lookup tool 18 may include a text box for manually entering the entitlement identifier and a button for the team member to click to complete the input.

In one embodiment, the team member interface 3 may also contain a scan history indicator 19. The scan history indicator 19 displays the results of the previous entitlement scans. The number of previous entitlement scans that are displayed may be configurable. In one embodiment, the default number of previous entitlement scans is ten. The scan history indicator 19 may display information about the entitlement and the scan including the entitlement identifier, whether the entitlement scan was successful, where the last scan of the entitlement took place, etc.

Although not shown in FIG. 3, in one embodiment, the team member interface is configurable such that the lighting level of the screen can be increased or reduced. The lighting level may be configurable by the team member who is operating the device. This feature allows the team member to adjust the lighting level depending on whether the team member interface is being used in a dark location or a bright location. Furthermore, in outdoor locations the amount of ambient lighting may change during the course of the day and night, thus it would be desirable for the team member to be able to adjust the lighting level of the screen of the team member interface 3 to ensure that the screen is always clearly visible.

Figure 4:
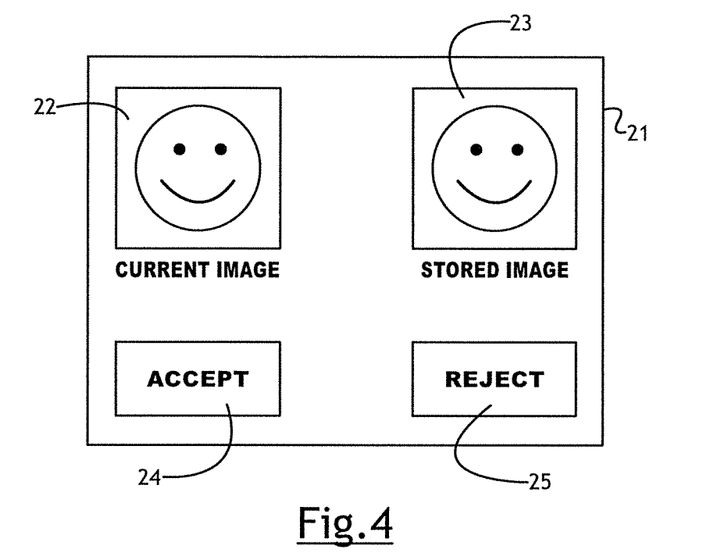
FIG. 4 is a schematic representation of a team member override interface in accordance with present embodiments.

Referring to FIG. 4, one embodiment includes a team member override interface 21. The team member override interface 21 may include a window that pops up from the team member interface 3 if the biometric software is unable to authenticate the guest that scanned the entitlement. When the biometric software is unable to authenticate the holder of an entitlement then the team member who is operating the facial recognition system 1 must make a decision whether or not the guest presenting the entitlement matches the guest that enrolled with the entitlement. While the biometric software compares captured templates to stored templates to determine matches, the team member must compare a captured thumbnail with a stored thumbnail and make a determination whether the two people shown are the same. At the expiration of the match timer if no match has been made then the team member interface 3 will display a "no match found" status in the status indicator 17. This will alert the team member that they must review the stored thumbnail to validate the entitlement. At this point a button will become available in the team member interface 3 that will give the team member the opportunity to review the stored thumbnail. It is important that the stored thumbnail not be displayed until the team member is ready to view it in order to prevent the unnecessary display of guest images. In addition, the guest interface 2 will use the exception indicator 13 to signal to the guest that there has been an exception and they should wait for instructions from the team member.

Once the team member has hit the button to allow them to view the stored thumbnail, the team member override interface 21 will pop up and will display two images. Although the biometric software will not have been able to make a match, the facial recognition system 1 will determine which pair of stored template and captured template have the highest matching score. The team member override interface 21 will then display the stored thumbnail and captured thumbnail associated with the highest matching score. The stored thumbnail will be displayed as the stored thumbnail display 23 and the captured thumbnail will be displayed as the captured thumbnail display 22. The team member override interface will also display two buttons for the team member to select from. The first is the accept button 24, which allows the team member to indicate that the stored thumbnail matches the captured thumbnail. The second is the reject button, which allows the team member to indicate that the stored thumbnail does not match the captured thumbnail. As soon as either button is selected, the team member override interface will disappear (and the two displayed thumbnails with it) to prevent any unnecessary display of guest images. If the team member has selected the accept button 24 then the guest interface 2 will light the success indicator 12 to indicate to the guest that they may proceed. In addition, the team member interface 3 will display the new transaction in the scan history indicator 19 and will show a successful transaction in the status indicator 17. If the team member selects the reject button 25 then the guest interface 2 will illuminate the exception indicator 13 to indicate to the guest that the transaction has not been successful and the team member should verbally indicate to the guest that they are not the proper holder of their entitlement and refuse to allow them access. In addition, the team member interface 3 will add the failed transaction to the scan history indicator 19 and will display the indicator for a failed biometric scan in the status indicator 17.

Figure 5:
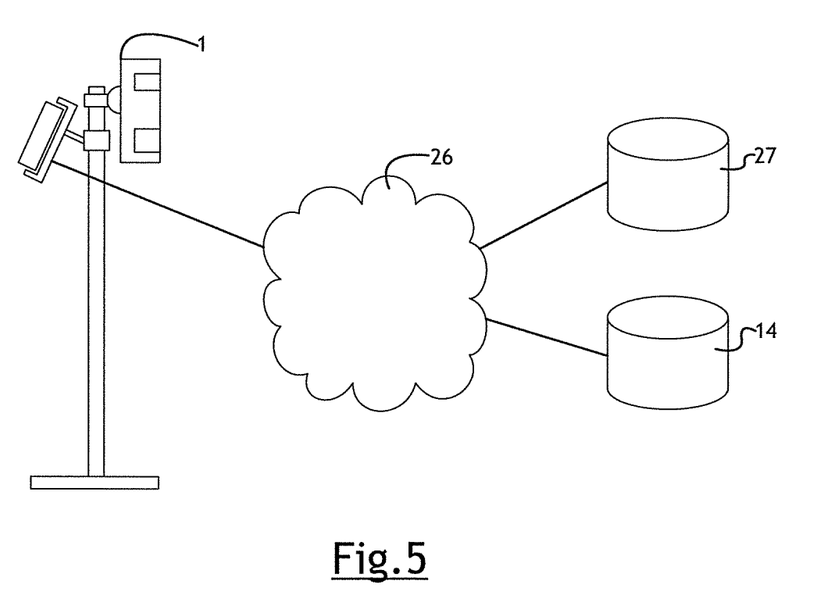
FIG. 5 is a schematic diagram of a connection between a facial recognition system and an entitlement database and biometric database to which it is connected in accordance with present embodiments.

Referring to FIG. 5, a network view of the facial recognition system in accordance with present embodiments is shown, including the different components of the system that are in different locations. For larger deployments of the facial recognition system 1 where more than one location must be covered, present embodiment may provide the ability to provide facial recognition capabilities at multiple locations. Multiple facial recognition systems 1 may be connected together by use of a network 26. The network 26 may be a wired network such as an Ethernet network or it may be a wireless network using some form of wireless communications such as WiFi or a public cellular network. In one embodiment, the facial recognition systems 1 connects to a wired backbone network by way of a WiFi network. Each of the facial recognition systems 1 is able to connect over to the network 26 to a biometric database 14 and an entitlement database 27. The entitlement database 27 stores information about entitlements, including the unique identifier for each entitlement and the validity and expiration information for each entitlement. Entitlements must be valid or else a biometric check is not necessary. The biometric database 14 stores records associated with each entitlement. The record is based on the unique identifier for each entitlement and the biometric database 14 stores all of the stored full-size images, stored thumbnails, and stored templates that are associated with each entitlement. Although other information may be stored in the biometric database, in one embodiment, no information (other than stored full-size images and stored thumbnails) is stored in the biometric database 14 that can be used to identify a person such as a name or other identifying information. All of the biometric information stored in the biometric database 14 is only associated with a unique identifier for an entitlement.

Present embodiments may perform biometric authentication in both indoors and outdoors locations. This means that present embodiments may be able to match guest images in a wide variety of lighting conditions ranging from very dark to bright sunlight. Captured templates are more likely to match with stored templates if both templates were created in a similar lighting level. In order to ensure that the biometric database 14 contains templates from as many different lighting levels as possible, in one embodiment, the facial recognition system 1 captures guest templates and calculates a lighting score for each template that is a measure of the ambient lighting in the environment where the template is captured. This lighting score can be determined by having the biometric software evaluate the overall lighting level in the guest images from camera 5, or the biometric software may evaluate the lighting level in the background of the guest images, or the biometric software may evaluate the lighting level of the guest face in the guest image, or some form of lighting sensor may be communicatively connected to the facial recognition system 1 such that when guest images are captured by the camera 5 the ambient lighting level determined by the lighting sensor would be associated with the template.

Regardless of how the lighting score is determined, in one embodiment, each stored template in the biometric database 14 is associated with a lighting score and each record in the biometric database 14 is configured so as to store templates that represent a range of different lighting levels instead of only storing the highest scoring templates regardless of lighting condition. In one embodiment, lighting scores are calculated numerically and each range of values would correspond to a lighting category. In one embodiment, the categories are "dark", "medium", and "bright". A certain number of templates stored in each record of the biometric database 14 are reserved for each lighting category, where the highest scoring templates within each lighting category are stored. In one embodiment, each record in the biometric database 14 can store up to 20 templates and six templates are reserved for dark templates, eight templates are reserved for medium templates, and six templates are reserved for bright templates. In accordance with present embodiments, the number of lighting categories may be increased or decreased depending on the needs of the specific application. Furthermore, the number of templates and thumbnails that could be stored in each record in the biometric database 14 may vary based on various factors including the specific application, the number of lighting levels to be used, the storage capacity of the biometric database 14, the storage capacity of the team member interface 3, and the capacity of the network 26.

Figure 7:
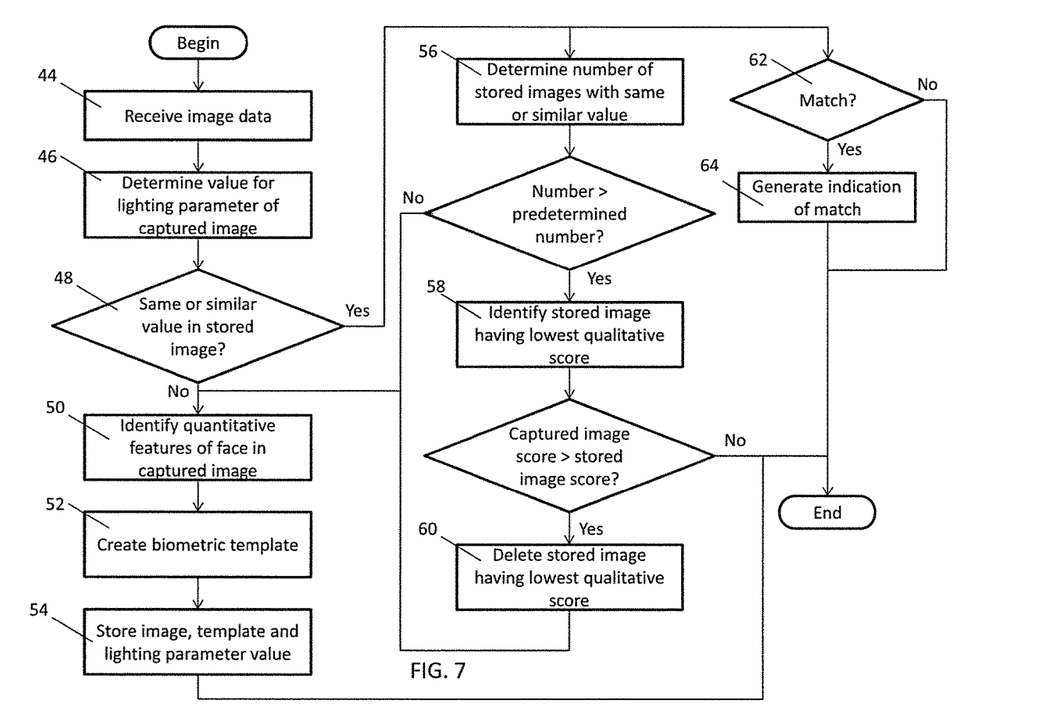

Referring to FIG. 7, a processor in system 1 may again be configured to perform a number of the steps as described above. In particular, the processor may perform the step 44 of receiving image data from camera 5 including an image of the face of an individual captured by camera 5. In step 46, the processor may determine a value for a lighting parameter associated with the image. The lighting parameter may comprise a degree or intensity of luminance in the image or a level of contrast in the image. As noted above, the parameter value may be determined by, for example, analyzing the image itself or using a lighting sensor. In step 48, the processor determines whether a collection of previously obtained images of the face of the individual in biometric database 14 already includes an image having the same or similar value for the lighting parameter. The processor may compare the images to see if the value of the lighting parameter associated with the captured image from camera 5 meets a predetermined condition relative to the previously obtained images. For example, the processor may see if the values are equal or within a certain range or if the value of the captured image falls with the same range of values as the value of a previously obtained image. If the comparison indicates that the collection of previously obtained images does not include an image having the same or similar value for the lighting parameter (depending on the scope of stored images desired), the processor may perform several steps to add the captured image to the stored images including the steps 50, 52 of identifying quantitative features of the face of the individual in the captured image that facilitate biometric validation and creating a biometric template of the image using those qualitative features provided the features meet predetermined requirements for a useful image/template. Thereafter, the processor may, in step 54, store and associated the captured image, biometric template and lighting parameter value in the biometric database 14. In some cases, it may be desirable to maintain multiple images having the same or similar values for a lighting parameter. Therefore, even if the processor determines the values for the parameter in the captured image and stored image or images are the same or similar, the processor may be configured to perform the step 56 of determining the number of images in the collection of previously obtained images having the same or similar value for the lighting parameter and to then perform steps 50, 52, 54 as long as the number does not exceed a predetermined number. In cases where there are a sufficient number of images in biometric database 14 having the same or similar values for a lighting parameter, it may still be desirable to compare images to insure that the best images are maintained. Therefore, even if the processor determines that there are a sufficient number of images in database 14 having the same or similar values for a lighting parameter, the processor may be configured to perform the step 58 of identifying a low scoring image having the lowest qualitative score among those images and, if the score is lower than the qualitative score of the captured image, to replace the stored image by deleting the stored image in step 60 and performing steps 50, 52, 54 for the captured image. In addition to managing the collection of images on database 14, processor may be configured to make use of the value of the lighting parameter during authentication. In particular, if the processor determines in step 48 that the collection of previously obtained images in biometric database 14 already includes an image having the same or similar value for the lighting parameter, the processor may be further configured in step 62 to determine whether the image captured by camera 5 meets one or more predetermined condition relative to the stored image including conditions evidencing an match in the identity of the individual in the two images. If so, the processor may be configured to generate a signal indicative of a match in step 64.

One example of a possible use of present embodiments that is intended to explain the features described above but not limit the scope of the disclosure is that if a guest enrolls at a location where the ambient lighting is dark then the templates stored in the biometric database 14 at the time of enrollment will all be stored as dark. If the guest later redeems their entitlement at a location that is bright, the captured templates will all be captured in a bright light level and compared by the biometric software to stored templates that were captured previously in a dark light level, resulting in a reduced probability of the biometric software being able to match and an increased probability that the team member operating the facial recognition system 1 will need to manually verify the identity of the entitlement holder. However, the new captured templates will be stored in the biometric database 14 as bright templates. In this way, any subsequent transactions that take place in dark or bright environments will have captured templates being compared to stored templates from a similar lighting level, therefore increasing the probability that the biometric software will be able to make a match. Thus, one embodiment stores templates across a wide range of possible lighting conditions, making it more likely that guests attempting to redeem entitlements will be able to do so regardless of the lighting conditions. In a sense, present embodiments may "learn" as the guest performs multiple transactions what the guest looks like in a variety of different lighting conditions, thus improving performance the more frequently it is used.

While the invention has been shown and described with reference to one or more particular embodiments thereof, it will be understood by those of skill in the art that various changes and modifications can be made without departing from the spirit and scope of the invention.

What is claimed is:

1. A facial recognition system, comprising:
a camera;
a processor configured to:
receive image data from the camera, the image data including a first image of a face of an individual;
calculate a first score indicative of the likelihood that the face of the individual in the first image is identical to the face of the individual in a second image from a biometric database;
determine whether the first score exceeds a dynamic match threshold;
generate a first signal indicating that the faces of the individual in the first and second images are identical if the first score exceeds the dynamic match threshold; and,
adjust the dynamic match threshold based on values of one or more parameters
wherein the processor is further configured to:
calculate a second score indicative of the likelihood that the face of the individual in the first image is identical to the face of the individual in a third image from the biometric database;
determine whether the second score exceeds the dynamic match threshold;
generate a second signal indicating that the faces of the individual in the first and third images are identical if the second score exceeds the dynamic match threshold.

2. The facial recognition system of claim 1, further comprising an entitlement scanner configured to obtain entitlement data from an entitlement presented by the individual and wherein the processor is further configured to receive the entitlement data from the entitlement scanner and to obtain the second image from biometric database based on the entitlement data.

3. The facial recognition system of claim 1 wherein the one or more parameters include a calendar date.

4. The facial recognition system of claim 1 wherein the one or more parameters include a time of day.

5. The facial recognition system of claim 1 wherein the one or more parameters include a frequency of use of the facial recognition system.

6. The facial recognition system of claim 1 wherein the one or more parameters include a performance speed of the facial recognition system.

7. The facial recognition system of claim 1 wherein the one or more parameters include a number of times that the dynamic match threshold is not exceeded.

8. A facial recognition system, comprising:
a camera;
a processor configured to:
receive image data from the camera, the image data including a first image of a face of an individual;
calculate a first score indicative of the likelihood that the face of the individual in the first image is identical to the face of the individual in a second image from a biometric database;
determine whether the first score exceeds a dynamic match threshold;
generate a signal indicating that the faces of the individual in the first and second images are identical if the first score exceeds the dynamic match threshold; and,
adjust the dynamic match threshold based on values of one or more parameters
wherein the one or more parameters include a performance speed of the facial recognition system.

9. The facial recognition system of claim 8 wherein the one or more parameters include a calendar date.

10. The facial recognition system of claim 8 wherein the one or more parameters include a time of day.

11. The facial recognition system of claim 8 wherein the one or more parameters include a frequency of use of the facial recognition system.

12. The facial recognition system of claim 8 wherein the one or more parameters include a number of times that the dynamic match threshold is not exceeded.

13. The facial recognition system of claim 8, further comprising an entitlement scanner configured to obtain entitlement data from an entitlement presented by the individual and wherein the processor is further configured to receive the entitlement data from the entitlement scanner and to obtain the second image from biometric database based on the entitlement data.

14. The facial recognition system of claim 13 wherein the one or more parameters include a calendar date.

15. The facial recognition system of claim 13 wherein the one or more parameters include a time of day.

16. The facial recognition system of claim 13 wherein the one or more parameters include a frequency of use of the facial recognition system.

17. The facial recognition system of claim 13 wherein the one or more parameters include a number of times that the dynamic match threshold is not exceeded.

* * * * *